2 Sheets—Sheet 1.

I. D. JOHNSON.

INVALID BED.

No. 10,773. Reissued Oct. 19, 1886.

WITNESSES:

John Nolan
Wm. H. Carson

INVENTOR

Isaac D. Johnson,
per Joshua Pusey
Att'y.

N. PETERS, Photo-Lithographer, Washington, D. C.

I. D. JOHNSON.
INVALID BED.
No. 10,773. Reissued Oct. 19, 1886.
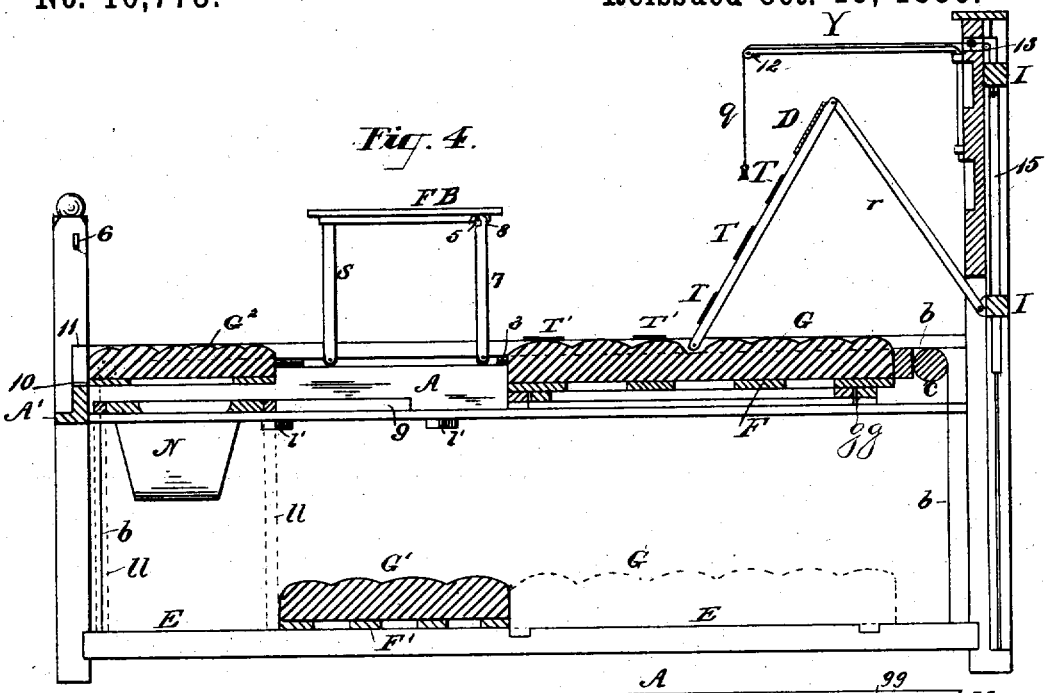
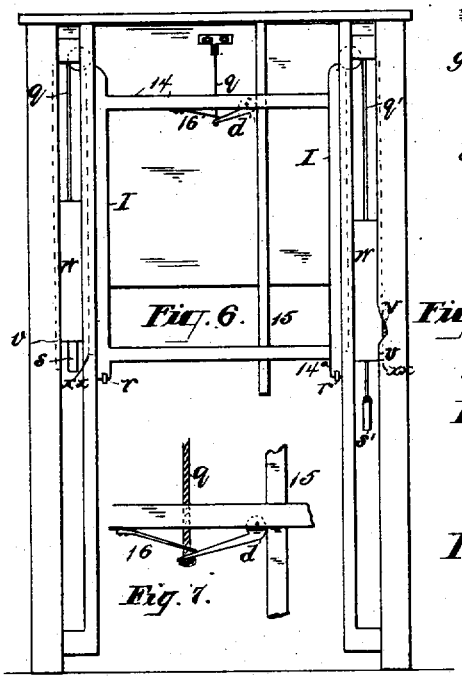
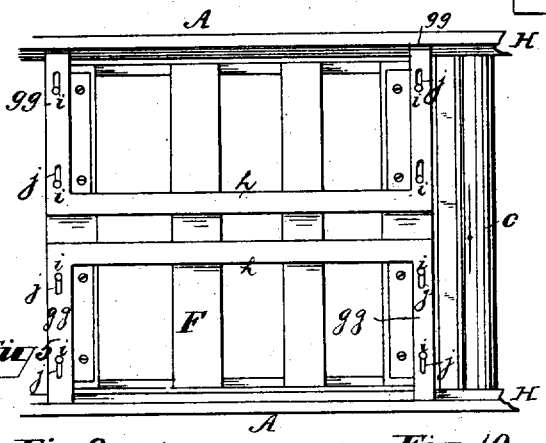
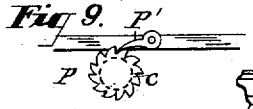
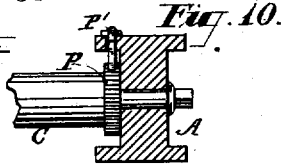
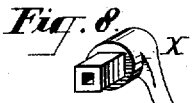
WITNESSES:
John Nolan.
Wm. H. Carson.
INVENTOR
Isaac D. Johnson.
per Joshua Rising Att'y.
N. PETERS. Photo-Lithographer. Washington, D. C.

UNITED STATES PATENT OFFICE.

ISAAC D. JOHNSON, OF KENNETT SQUARE, PENNSYLVANIA.

INVALID-BED.

SPECIFICATION forming part of Reissued Letters Patent No. 10,773, dated October 19, 1886.

Original No. 325,000, dated August 25, 1885. Application for reissue filed March 24, 1886. Serial No. 196,406.

*To all whom it may concern:*

Be it known that I, ISAAC D. JOHNSON, a citizen of the United States, residing at Kennett Square, in the county of Chester and State of Pennsylvania, have invented certain new and useful Improvements in Invalid-Beds, of which the following is a full, clear, and exact description, reference being had to the accompanying drawings, of which—

Figure 1:
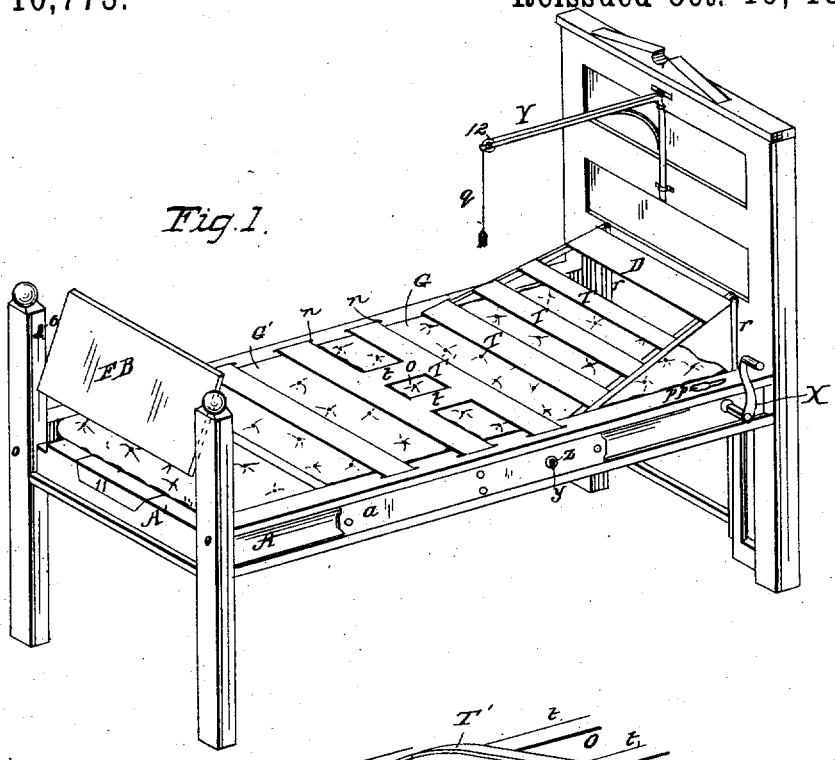
Figure 2:
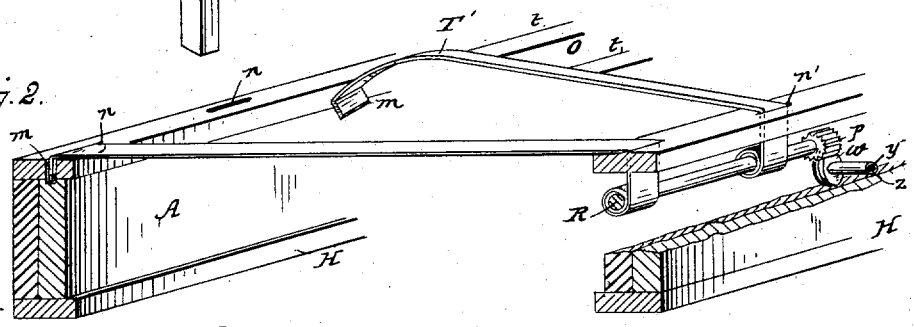
Figure 3:
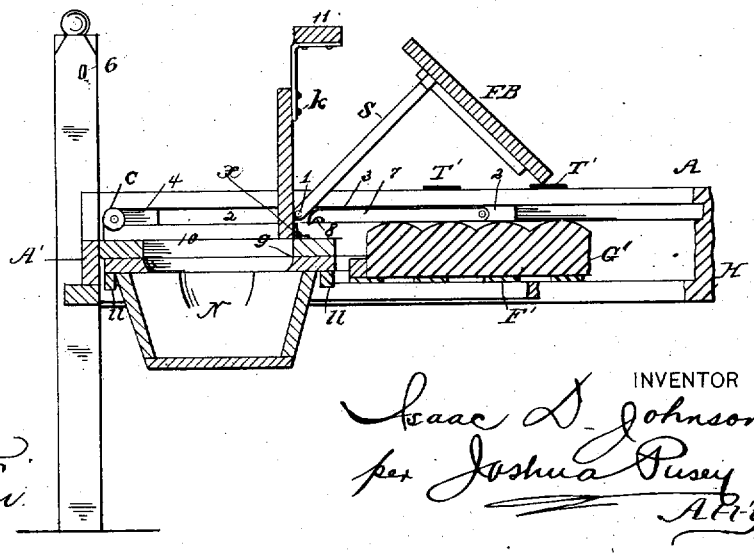

Figure 1 is a perspective view, the adjustable mattress-sections being at their highest position against the under side of the stretcher-straps, and the foot-board slightly raised on its pivots. Fig. 2 is a view, partly in section, showing the devices for securing the stretcher-straps, and also the tension-regulating mechanism enlarged. Fig. 3 is a middle longitudinal vertical section toward the foot of the bed, with the commode-lid elevated and the foot-board turned over forward. Fig. 4 is a central longitudinal vertical section of the bed, with the rear one of the adjustable mattress-sections lowered, and the foot-board arranged to form a table in convenient position for the occupant of the bed, sitting upon the retained section with his feet resting upon the lowered section. Fig. 5 is a view of the under side of the crib which supports the forward mattress section, showing the sliding frame hereinafter referred to. Fig. 6 is a rear elevation of the head-board. Fig. 7 is a detail, enlarged, of the spring-controlled eccentric locking device. Fig. 8 represents the crank used for operating the mattress-lowering mechanism, the tension-regulating device, &c. Fig. 9 represents a detached view of a portion of the elevating mechanism, showing the ratchet and pawl for holding the same; and Fig. 10 represents a sectional view showing one end of the elevating-roller, its journal, and the ratchet and pawl for holding it.

My invention relates to improvements in invalid-beds, and more especially to those shown and described in Letters Patent of the United States granted to me on the 4th of October, 1881, and the 28th of November, 1882, numbered, respectively, 247,921 and 268,238, to which reference may be had.

Its main object is to perfect the construction and increase the convenience and efficiency of my said patented beds.

The present improvements consist, first, in more convenient devices and mechanism for securing and tightening the cross or stretcher straps which support the invalid when the mattress is lowered; secondly, to a certain construction whereby the mattress and its supporting-crib are made in sections, and both sections are capable of being lowered simultaneously; or the rear one of the sections may be lowered while the other is sustained in position up against the stretcher-straps, whereby the invalid may sit upon the sustained section and rest his feet upon the lowered and vertically-adjustable section; thirdly, to a special construction and arrangement of the foot-board of the bed, whereby it may be utilized to form a table adapted to be placed in convenient position for the occupant of the bed, and readily converted back to a foot-board; fourthly, to a certain arrangement of the sliding commode, whereby it is located at the foot of the bed in position to be conveniently used by the invalid when not in bed, and yet may be readily moved up beneath him and adjusted vertically when the mattresses are lowered, when the person occupies the sitting posture; fifthly, to improved devices for locking and releasing the sliding frame at the back of the head-board, to which the movable head-section is pivoted; sixthly, to means whereby the counter-weights for the said head-section are stopped at different heights when the latter is elevated, and one of said weights is raised a certain distance independently of the other when the head-section is lowered, whereby certain advantages are gained which will be hereinafter set forth.

Finally, the invention consists in certain novel details of construction, which will be fully explained, and pointed out in the claims.

A are the usual side rails of the bedstead, and D is the head-section, pivoted to the side of the rails A, as shown in my patents above referred to.

T are the usual transverse supporting-straps secured to the sides of this head-section, and T′ are other like cross-straps of suitable width and distance apart. The first two of these straps are connected by straps *t*, thus leaving a rectangular opening, *o*, about the middle of the bed, beneath which the commode N is adapted to be slid when the mattress-section is lowered. Straps *t* serve as stays to keep the connected stretcher-straps from separating.

To the ends, upon one side, of the straps T′ are secured strips or clips *m*, Fig. 2, of metal or other rigid material, while the top of the side rail is provided with narrow slots *n*, of such dimensions as to freely receive the clips *m*. The mechanism for tightening these cross-straps consists of a tube or roller, R, journaled longitudinally in the side of the opposite rail, A, to which roller the ends of the straps, passed through narrow slots *n*′, Fig. 2, are secured. At one end of the roller is a small pinion, *p*, into the teeth of which gears a worm, *w*, whose shaft *y* has a rectangular aperture, *z*, therein, adapted for the reception of the rectangular head of a crank, X, Fig. 8. These parts are usually concealed by an exterior plate, *a*, Fig. 1, through which shaft *y* projects.

Now, it will be obvious that when the crank (*i. e.*, the worm and roller) is turned in the proper direction the straps T′ will wind upon the latter and be thereby tightened. The stress upon the straps being at right angles to the sides of clips *m*, inserted in the slots in the side rail on the opposite side of the frame, there is no tendency to draw out said clips from the respective slots.

E, Fig. 4, is the platform that supports the frames or cribs F F′, upon which the mattress-sections G G′ respectively rest. It is vertically movable by the same mechanism as that shown in my aforesaid patents—that is to say, by means of a combination of cords *b*, transverse rollers *c*, and crank X with a ratchet and pawl, *p p*′.

The construction I have heretofore used has been such that the entire mattress had to be lowered when necessary. I now provide two cribs, F F′, and two mattress-sections, G G′, divided about the middle of the bed. The under side of the forward crib, G, is provided at each end and on each side with bars *g g*, connected, respectively, by cross-pieces *h*, constituting two sliding frames, which are secured to the under side of the main frame G by means of screws *i* in slots *j*. By reaching underneath the said rails A these slide-frames may be pushed outward—that is, one toward one of the rails A and the other toward the opposite side—whereupon their ends are projected over, and the ends of bars *g g* rest on the upper sides of the shelf-rails H, respectively. Now, as the crib F is thereby sustained, it is evident that when the platform E is lowered said crib, with its mattress G, will remain in the position shown in Fig. 4, and that only the mattress G′ will descend with the platform, as also shown in said figure. When, however, it is desired that both sections shall be lowered together, the sliding frames are drawn toward each other, which releases the ends of the sliding frames from the shelf-rails H. When the crib-mattress F′ G′ is lowered, as in Fig. 4, the occupant of the bed, sitting upon the edge of the sustained section, may rest his feet upon the mattress G′, and the latter can be adjusted to any convenient height by moving the platform E up or down by means of the mechanism hereinbefore referred to, which is operated by the crank X. While the person is thus sitting, the foot-board F B, converted into a table, may be moved up directly in front, as seen in Fig. 4, the rear one of the stretchers, T′, being removed out of the way by pulling it up vertically, and thereby drawing the end clips, *m*, out of the slots *n*.

I shall now describe the construction and arrangement of this foot-board and the parts connected therewith.

To its lower side, at each end, are secured rigid straps S, which are pivoted at 1 to bars or cleats 2, that are adapted to slide longitudinally in grooves 3 on the inner side of the side rails, A. The rear ends of these bars 2, when pushed toward the foot of the bedstead, abut against stops 4, Fig. 3, located so that the said bars stop at a point which brings the lower or rear edge of the foot-board, when rotated on its pivots, in position to clear the outer edge of the foot-rail A′, and allows the eyes 5, on the outer edges of the board, to register with and receive the hook-pins 6 on the inside of the foot-posts, which secure the board in position. In Fig. 1 the foot-board is elevated, in order to show certain parts, which would be hidden if the board were shown in place in the vertical position.

In order to retain the forward end of the board when converted into a table, I also pivot to the sliding cleats 2 stays 7, at a suitable distance from the straps S. Ordinarily, these stays lie close along the side rails, as seen in Fig. 3, but are turned up in a vertical position, and hooks 8 on the ends are caught into the eyes 5, as seen in Fig. 4, thus supporting the foot, or now the table-board, on the front side.

To reconvert this table into the foot-board, it is obvious that it is merely required to unhook the stays 7, press them down to their horizontal position, slide back the board until the rear ends of the cleats strike against the stops 4, then rotate the board back on its pivots until the hooks 6 enter the eyes 5.

At the foot of the bed is the commode N, which is contained in a frame with end bars or cleats, 9, adapted to slide forward when the mattress-sections are lowered sufficiently upon the top of the shelf-rails H into position to suit the convenience of the occupant of the bed—that is, directly beneath the aperture *o*, formed by the straps T′ and connecting-straps *t*, previously mentioned. At each end of the commode-frame are pivoted legs *l l*, which are ordinarily retained in a horizontal position by means of turn-buckles *l*′ *l*′, but which may be allowed to fall to a vertical position, as indicated by dotted lines in Fig, 4, so that their lower ends will be over the top of the platform-rail when the latter is fully down. The purpose of this construction is to provide a means for elevating the commode in order to bring it close up under and support the sitter.

The free space between the top of the shelf-rail and the bottom of the top rail allows a vertical play of the commode-frame, and by moving up the platform by turning the crank the commode is elevated, owing to its legs *l l* being caught by the platform-rail E in the same manner as described in my said patent No. 268,238. Without these legs it would be necessary to elevate the platform to a height that would raise the feet of the person resting upon the mattress G′ to an uncomfortable elevation. The commode-frame lies beneath a board or platform, 10, which serves to support a mattress-section, $G^2$. To this frame at *x*, Fig. 3, is hinged a lid, *k*, that ordinarily covers the commode-seat. A rail, 11, secured to the rear end of this lid, constitutes a section of the foot-rail of the bedstead when the lid is down. The mattress section $G^2$ being removed, the foot-board thrown over, and the lid turned up, as in Fig. 3, a space is left in the foot-rail immediately in front of the commode.

The object of the construction just described is to enable the invalid when out of bed to use the commode without the necessity of returning to the bed for that purpose.

Y is the swinging crane at the head of the bed, having a sheave, 12, at its extremity, over which and also over a sheave, 13, journaled near the top of the head-board, passes the cord *q*, which depends within reach of the patient and connects with the weighted sliding frame I at the back of the head-board, to which the head-section D is attached by the pivoted rods *r*.

These parts are, in the main, similar in construction and operation to those shown in my Letters Patent hereinbefore referred to, and therefore require no detailed description. I have, however, substituted an improved device for retaining the head-section at any desired height, and releasing the same by means of the operating-cord *q*, as follows: In lieu of the spring-controlled catch-bolts attached to the cross-piece 14 of the counterbalanced frame I, adapted to engage the teeth on the vertical strip 15, fastened to the head-board, I use an eccentric-pawl, *d*, Figs. 6 and 7, pivoted to the cross-bar 14, near the strip 15, which strip passes through slots in said cross-bar, and also in a like transverse bar, $14^a$, at the lower end of the frame. To the free end of pawl *d* is secured the operating-cord *q*, and a spring, 16, fastened to the under side of bar 14, presses against the end of the pawl, thereby tending to keep the eccentric head against the side of said vertical bar, and thus to retain the frame, and consequently the head-section D, in place. When, however, the cord *q*, depending from the crane Y, is drawn down by the occupant of the bed or an attendant, the pawl is rotated on its pivot, and the face of the eccentric is freed from contact with the vertical bar, and the invalid is enabled to depress the head-section by pressing down upon and against the same with his back; or the attendant may accomplish the same result. The instant the pull upon the cord is loosened, the eccentric-head *d* impinges against the edge of strip 15, and the head-section is thereby retained at the desired angle or degree of elevation.

It will be obvious that when the cord *q* is pulled down and the head-section elevated the weight required to counterbalance is materially less as the head-section is elevated, and so conversely.

In order to vary the counter-balance to suit the different conditions, I make the weights W with flanges *u*, that work in grooves *v* in each side of the recess in which they (the weights) move, and the side grooves are closed at different heights for the respective weights, as seen at *x x* in Fig. 6, so that as the head-section is elevated the downward movement of first one of the weights and then the other at a suitable interval is arrested. The weight-cords *q′* pass through longitudinal holes in the weights W, and are provided with sinkers S′ at their free ends, one of said cords being longer than the other, so that one of the weights shall be caught sometime before the other when the head-section is pressed down, the difference being such as circumstances may require.

The sinkers serve to keep the cords taut over their pulleys, as well as to catch the weights successively as the head-section is allowed to descend. These sinkers may also be of different weights, and thus further aid, so to say, in distributing the counterpoise; or they may be dispensed with, and the cords *q′* be secured to the weights in the usual manner.

The key of crank X has a rectangular aperture therein, whereby, with its exterior rectangular form, it is adapted to be applied to the square-head screws or bolts that are used to hold the posts and rails of the bedstead together.

Having thus described my invention, I claim as new and wish to secure by Letters Patent—

1. The combination of the side rails having the slots therein, the stretcher-straps provided with rigid clips on the ends thereof adapted to enter said slots, and the tension-regulating devices, consisting of the roller R, the pinion and worm, and means for rotating said worm, substantially as and for the purpose set forth.

2. In an invalid-bed, the combination, with a platform, such as E, and means for raising and lowering the same, of the mattress and supporting-cribs in independent sections adapted to be raised and lowered simultaneously, together with means for sustaining the forward section, when desired, so that the next section may descend with the said platform, while the forward section is sustained free from the latter, and thus prevented from descending with the platform, substantially as and for the purpose set forth.

3. The combination, with the invalid-bed, of the vertically-movable platform and the mattress-crib provided with sliding frames, adapted to engage with the shelf-rails for sustaining the ends of said sliding frame, substantially as specified.

4. In combination with the commode located at the foot of the bed, the pivoted sliding foot-board, substantially as and for the purpose specified.

5. The combination, with the mattresses and the vertically-movable supporting-platform, of the foot-board and its cleats, adapted to slide in grooves, whereby the foot-board may be moved longitudinally and brought to a horizontal position, substantially as and for the purposes specified.

6. The combination, with the convertible foot-board and table, of the straps S, pivoted to the sliding bars 2, and the stays 7, also pivoted to said bars and having hooks adapted to engage with eyes attached to the said foot-board or table, substantially as and for the purpose specified.

7. In combination with the commode located at the foot of the bed, the foot-rail cut away in front of the commode, and the hinged lid having a section secured thereto corresponding to the cut-away portion of the foot-rail, substantially as and for the purpose specified.

8. The combination of the pivoted head-section connected by the pivoted bars *r* to the sliding weighted frame in the rear of the head-board, the cord *q*, the fixed vertical bar 15, and the pivoted eccentric pawl *d*, having the cord *q* attached to its free end, together with the spring 16, all constructed and adapted to operate substantially as and for the purpose described.

9. In combination with the hinged head-section pivoted to the vertically-sliding frame I, and the operating-cord *q*, connected with said frame, substantially as described, of the weights W, with means for arresting the descent of the same at different heights or points, together with the weight-cords *q'*, attached to said sliding frame, and provided, respectively, with sinkers, as S', the whole constructed and adapted to operate substantially as and for the purpose set forth.

ISAAC D. JOHNSON.

Witnesses:
WILLIAM W. POLK,
JOHN OCHELTREE.